(12) United States Patent
Roughani

(10) Patent No.: US 7,583,967 B2
(45) Date of Patent: Sep. 1, 2009

(54) METHOD AND DEVICES FOR TRANSFERRING DATA TO A MOBILE UNIT

(75) Inventor: Amir Roughani, Hallbergmoos (DE)

(73) Assignee: AXIS Engineering GmbH, Munich (DE)

( * ) Notice: Subject to any disclaimer, the term of this patent is extended or adjusted under 35 U.S.C. 154(b) by 527 days.

(21) Appl. No.: 11/088,687

(22) Filed: Mar. 23, 2005

(65) Prior Publication Data
US 2005/0250525 A1 Nov. 10, 2005

(30) Foreign Application Priority Data
Mar. 23, 2004 (DE) .................. 10 2004 014 130

(51) Int. Cl.
*H04Q 7/00* (2006.01)
(52) U.S. Cl. ............... 455/438; 370/328; 370/401; 370/350
(58) Field of Classification Search ........ 370/312, 370/390, 328, 401, 350; 709/219
See application file for complete search history.

(56) References Cited

U.S. PATENT DOCUMENTS

| | | | | |
|---|---|---|---|---|
| 4,866,770 A | * | 9/1989 | Seth-Smith et al. | |
| 5,030,948 A | * | 7/1991 | Rush | |
| 5,652,795 A | * | 7/1997 | Dillon et al. | |
| 5,699,275 A | * | 12/1997 | Beasley et al. | |
| 6,069,956 A | * | 5/2000 | Kurihara | 380/212 |
| 6,307,837 B1 | * | 10/2001 | Ichikawa et al. | 370/230 |
| 6,625,154 B1 | * | 9/2003 | Murata | 370/395.4 |
| 2003/0147389 A1 | * | 8/2003 | Zirwas | 370/390 |
| 2004/0068555 A1 | * | 4/2004 | Satou | 709/219 |
| 2004/0088739 A1 | * | 5/2004 | Shimoji et al. | 725/135 |
| 2004/0236479 A1 | * | 11/2004 | Hattori | 701/2 |
| 2005/0090276 A1 | * | 4/2005 | Rajkotia | 455/515 |
| 2005/0207393 A1 | * | 9/2005 | Becker et al. | 370/350 |
| 2006/0182055 A1 | * | 8/2006 | Coffee et al. | 370/328 |
| 2006/0194535 A1 | * | 8/2006 | Houldsworth et al. | 455/3.01 |

FOREIGN PATENT DOCUMENTS

DE 101 05 454 A1 * 8/2002

* cited by examiner

Primary Examiner—Patrick N Edouard
Assistant Examiner—Julio R Perez
(74) Attorney, Agent, or Firm—Peter F. Corless; Christine C. O'Day; Edwards Angell Palmer & Dodge LLP

(57) ABSTRACT

According to the invention, in a transfer of data (1) to at least one mobile unit the data (1) are provided with an identifier (7) that assigns the data (1) to the at least one mobile unit. The data (1) are assembled into a data stream (20) receivable by a multitude of mobile units, which is transmitted by means of at least one transmitting device (8) via at least one transmission path (22). At the mobile unit (23) end the data stream is received by means of at least one receiving device (9) and the data (1) are filtered from the received data stream (20) on the basis of the identifier (7).

17 Claims, 3 Drawing Sheets

METHOD AND DEVICES FOR TRANSFERRING DATA TO A MOBILE UNIT

Figure 1:
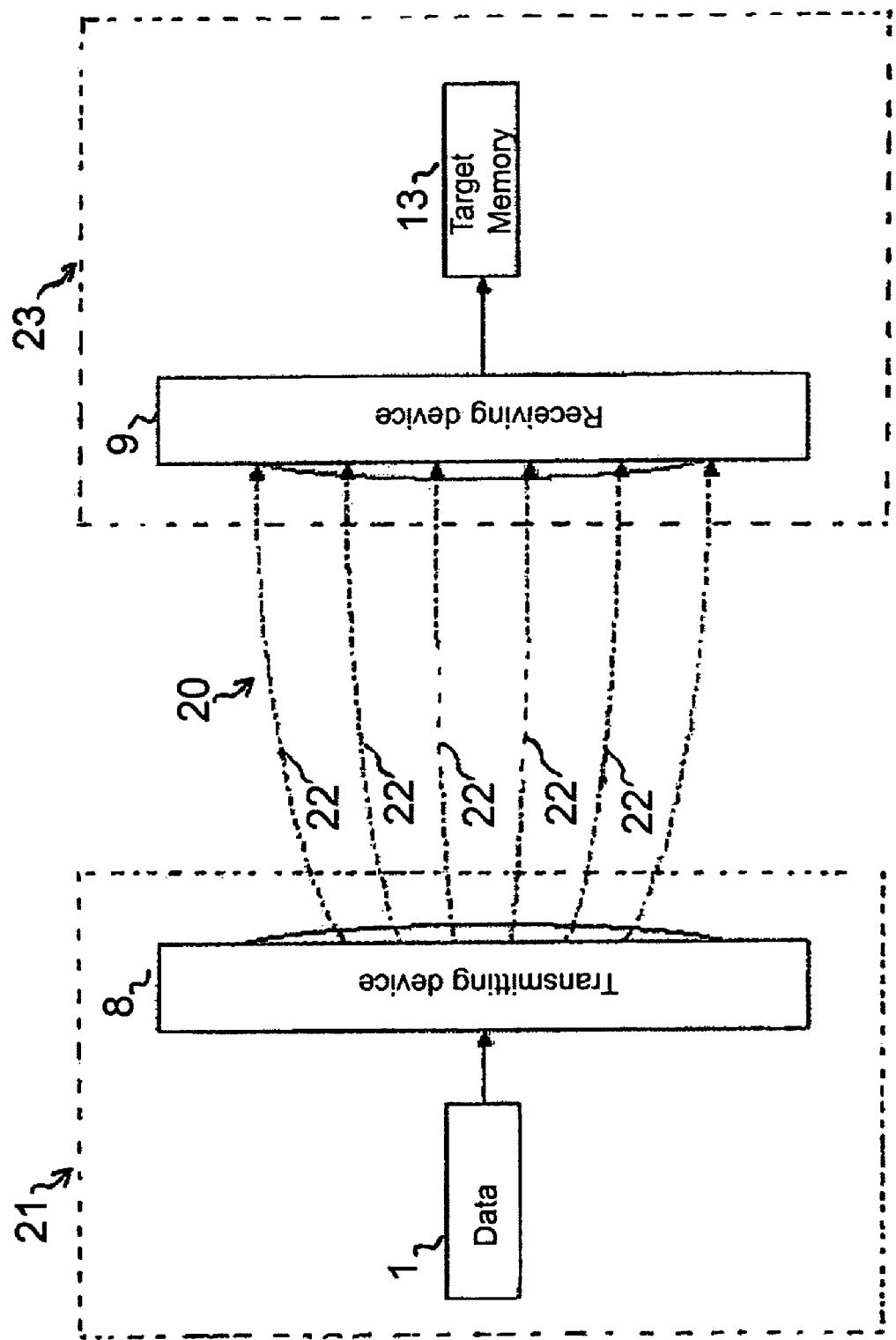

The present invention applies to a method as well as devices for transferring data at least one mobile unit, e.g. in a motor vehicle.

Present-day motor vehicles include a multitude of electronic systems that require data in terms of operating software and other operating data for the vehicle being put into operation. In particular the increasing complexity of operating software has lead to a situation in which operating software or other operating data within the motor vehicle must be exchanged or supplemented after its dispatch. In the case of motor vehicles, exchanging or supplementing operating software or other operating data after the vehicle's dispatch involves a considerable effort. This could, for example, imply that a huge number of motor vehicles have to be called back to garages for this purpose. Thus, there is a clear interest in creating simpler and more effective alternatives for executing so-called updates or upgrades of operating software or other operating data.

In this context, it is common practice to connect mobile units in a motor vehicle with a computer system, e.g. in a dealer's garage, or to use wireless communication systems of the motor vehicle, such as mobile phones, to transfer the required data to the mobile unit in question.

Common methods of transferring data to the mobile unit use individual data connections, which are bi-directionally established between the mobile unit and a transmission device that has the data at its disposal. These methods are particularly problematic when data have to be transferred to a multitude of mobile units, e.g. in case an operating software error makes it necessary for this operating software to be exchanged in all previously dispatched motor vehicles. In this case, the data to be exchanged typically have to be transferred to the respective motor vehicles in individual work steps. Even when several motor vehicles can be connected to a common bus system, the problem remains that the mobile units of these vehicles must share the bus system bandwidth, whereby individual transmission capacity is reduced. This is due to the fact that, even for identical motor vehicles, i.e. motor vehicles of the same type, which use, for example, the same operating software, each motor vehicle requires a new transfer of the same data.

In light of the difficulties in the prior art described above, the challenge of the present invention consists in providing a method as well as a device for transferring data to mobile units in which the data transfer is accomplished with little effort and a minimum of required bandwidth for the data transmission.

This problem is solved by a method pursuant to Claim 1 as well as a device pursuant to Claim 13 or 14. The dependent claims define preferred and advantageous embodiments of the invention.

According to the invention, the method of transferring data to at least one mobile unit, e.g. in a motor vehicle, labels the data with an identifier that assigns the data to at least one mobile unit. A data stream, which can be received by a multitude of mobile units is provided and comprises the labelled data. The data stream is transmitted by at least one transmitting device via at least one transmission path. The mobile unit receives the data stream by means of at least one receiving device of the at least one mobile unit and the data are filtered from the data stream on the basis of the identifier. Preferably, filtering of the received data stream is effected by saving only those data that are assigned by the identifier to the at least one mobile unit, while other data, e.g. data that are assigned to further mobile units, are discarded.

The combination according to the present invention of labelling of the data with an identifier and the corresponding filtering of the data stream makes it possible for data to be transferred either to individual mobile units or to groups of mobile units. This is achieved specifically by the fact that the selection of the data from the data stream is effected at the mobile unit end.

The provided identifier can be assigned to both individual mobile units and groups of mobile units. In this way data can be transferred individually to single mobile units, but also to several mobile units simultaneously. In particular when the same data is to be transmitted to a multitude of mobile units, a considerable reduction of the required transmission bandwidth is achieved.

Preferably, the data is encrypted prior to transmission and decrypted upon receipt by the mobile unit. The required key can either be associated with the identifier, or be provided independently thereof. By means of the encryption, unauthorized access to the data is prevented. In the simplest case, mobile units with an identifier matching the identifier of the data will be able to decrypt the data. In this case the key would be associated with the identifier. However, it is also possible to alternatively or additionally use keys not associated with the identifier, allowing for a further limitation to the group of mobile units with access to the data. For example, this could make it possible to charge for the provision of data by providing a charge-based key for data decryption. Charging for data transmission can be used to advantage, e.g. in connection with so-called "chip tuning". Chip tuning can, for example, provide higher engine performance through modified operating software or modified operating data of a motor vehicle. This will generally be a for-charge service.

Preferably the data stream for transferring the data to the at least one mobile unit comprises transmission units which are each labelled with an identifier. The transmission units can be transmitted repeatedly in the data stream, thus allowing the data, for example operating software, to be reassembled from the transmission units in the at least one mobile unit. The implementation of transmission units for data transfer adds flexibility to the data transfer and is of particular benefit in case the data stream with the labelled transmission units is transmitted by a multitude of transmitting devices. In this case, a mobile unit that has a receiving device capable of receiving the transmission units transmitted by various transmitting devices can recompose the data from transmission units that have been transferred from different transmitting devices. The advantage of this procedure is that the mobile unit is not limited to receiving data from a specific transmitting device, and in case data cannot be received completely from one transmitting device, missing data can be received from another transmitting device. This can become necessary in particular when the transmission path for the data stream is a wireless connection and the mobile unit moves out of reach of the wireless connection while data are being transferred. In this context it is particularly beneficial if the data stream is transmitted via multiple transmission paths and the mobile units include several receiving devices, each suited to receiving the data stream with the labelled transmission units from one of the transmission paths respectively. In this case, if one of the transmission paths is no longer available, e.g. because of the limited reach of a wireless connection, the missing part of the data can be received from an alternate transmission path, for example a wired connection.

The at least one transmission path or the transmission paths can include a short-range wireless connection, e.g. a so-called Bluetooth or wireless LAN, a long-range wireless connection, e.g. GSM or a digital radio connection, or even a wired connection. The above mentioned connections each have different specifications with respect to transmission capacity, transmission quality and availability. Therefore, it is particularly advantageous to use different transmission paths for the transmission so that, dependent on availability, the optimal signal source can be selected with regard to transmission capacity and transmission quality.

In particular, the data stream generated in the method according to the invention can also include data which are to be transferred to at least one further mobile unit and are assigned to at least one further mobile unit by a further identifier. This means that the data stream can include data that are destined to mobile units with different identifiers. In this way, for example, a data stream can be generated by means of which motor vehicles of different types can each be provided with new operating software or other data.

The method according to the invention is especially suited to provide mobile units set up in motor vehicles, e.g. board computer or control electronics of the vehicles, with operating data, for example operating software, to be renewed or exchanged.

The invention also pertains to a device for transferring data to at least one mobile unit. The transmission device includes labelling means for marking the data to be transferred with an identifier which assigns the data to the at least one mobile unit. The transmission device furthermore includes data processing means that are suited to generate a data stream including the labelled data to be transferred. In addition, the transmission device includes transmitting means, for example in the form of at least one transmitting device which transfers the data stream via at least one transmission path so that the data stream can be received by a multitude of mobile units.

The device according to the invention for receiving data in a mobile unit includes receiving means in the form of at least one receiving device for receiving a data stream and filter means for filtering the data from the data stream. The filtering is accomplished by means of an identifier that assigns the data to the mobile unit.

A system for the transfer of data to at least one mobile unit includes at least one transmission device according to the present invention for at least one device for receiving data in a mobile unit according to the present invention. Preferably, the system is configured for the implementation of the above-described method according to the invention.

The present invention allows for implementing the transfer of data to a mobile unit, for example a board computer or control electronics of a motor vehicle with a significant increased flexibility. This is particularly the case if the same data have to be transferred to a multitude of mobile units. Furthermore, the present invention allows for the flexible assignment of data to individual mobile units or groups of mobile units. As the selection of data from the data stream is effected at the mobile unit end, no bi-directional connection is necessary between the mobile units and the transmission device, from which the data stream is transmitted. In addition, it is possible to configure the access to transmitted data on a cost-basis. The data transer can be configured dynamically, i.e. data can be received from different transmission paths and then be reassembled within the mobile unit.

The invention will be explained in further detail below, with reference to the accompanying drawings on the basis of a preferred embodiment:

FIG. 1 gives an overview illustrating the transfer of data according to a preferred embodiment of the invention.

Figure 2:
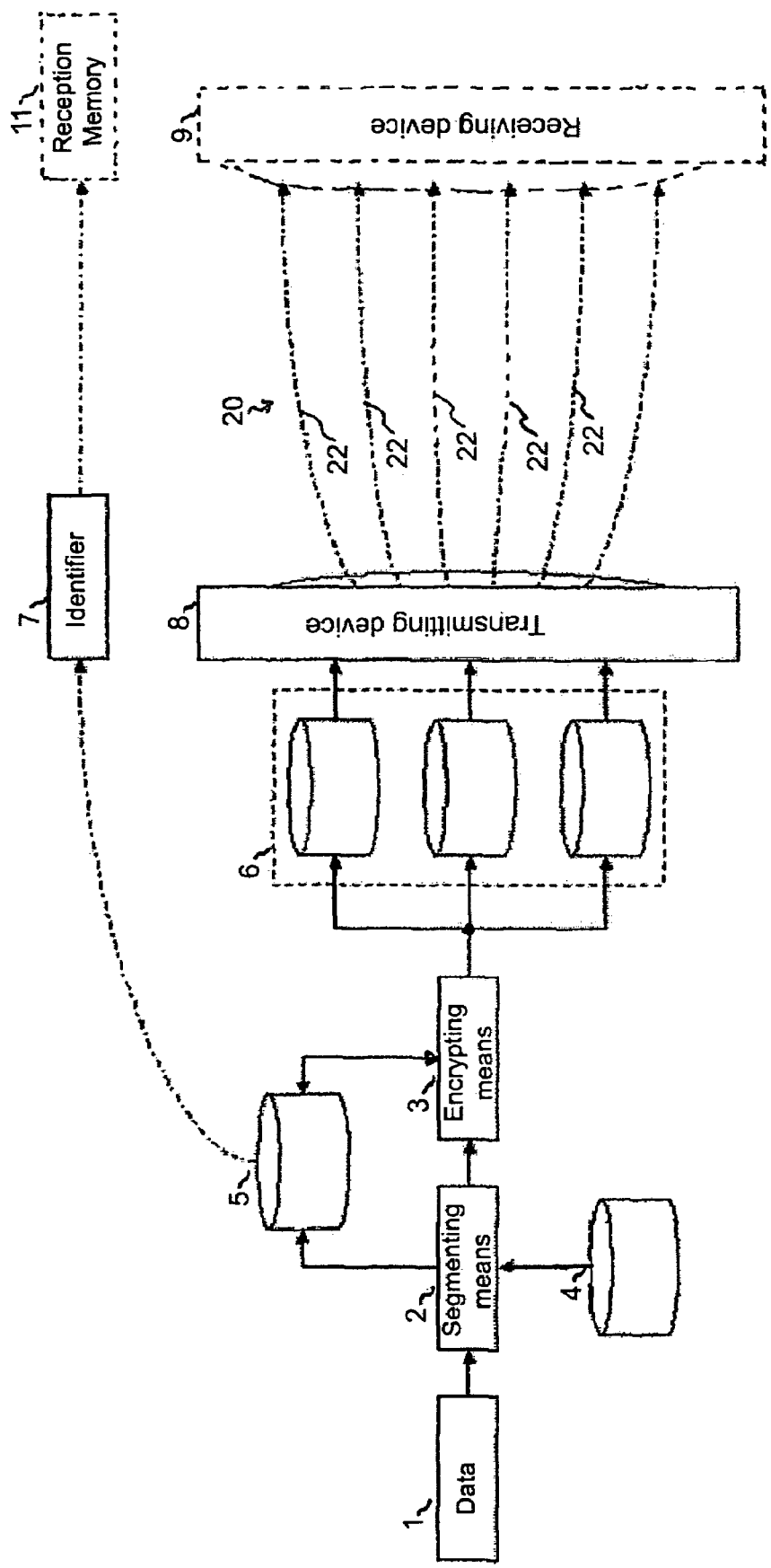

FIG. 2 demonstrates the transfer of data according to embodiment of the invention on the transmission device end.

Figure 3:
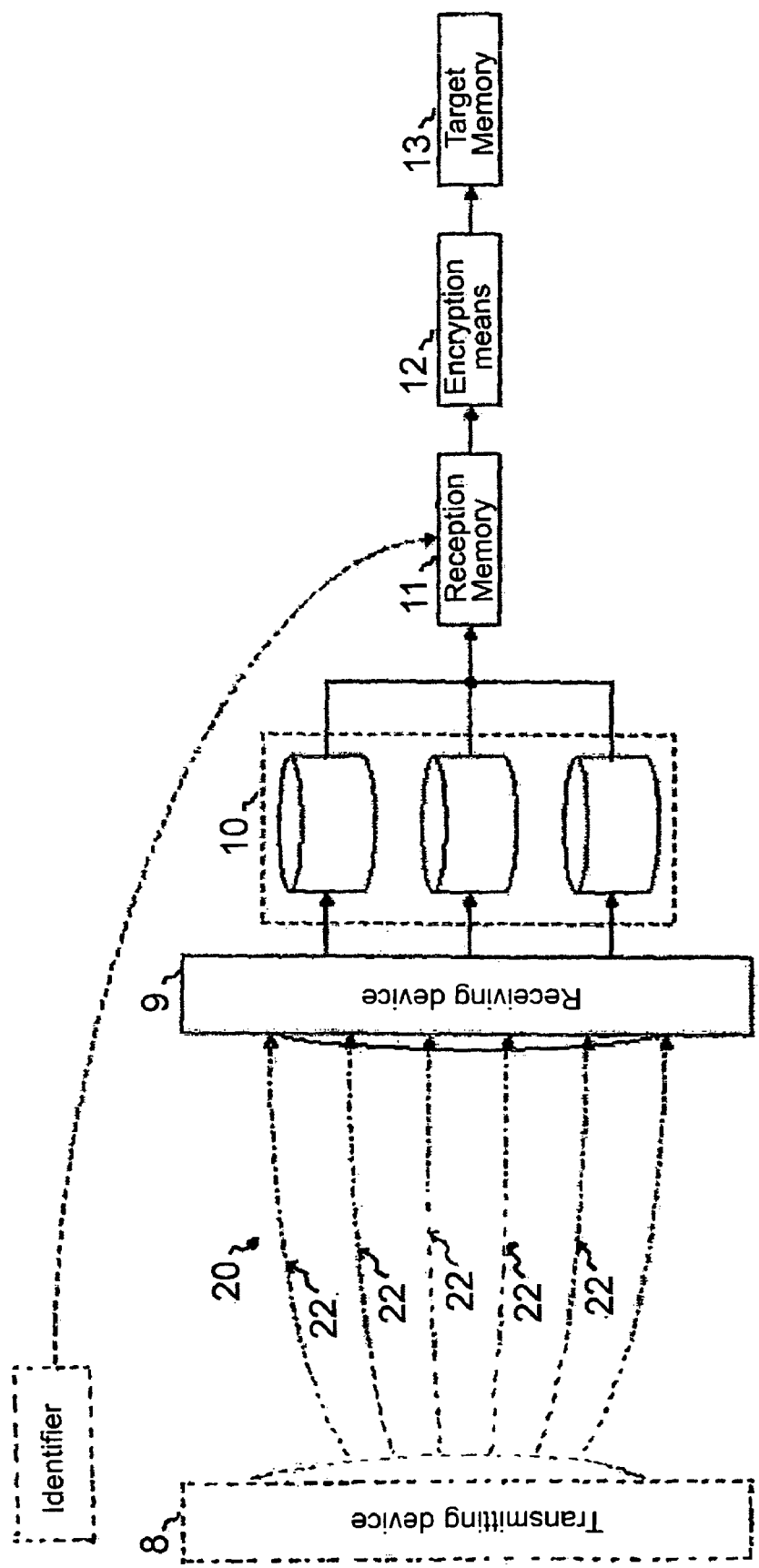

FIG. 3 demonstrates the transfer of data according the embodiment of the invention on the mobile unit end.

FIG. 1 gives an overview that demonstrates a transfer of data to a mobile unit 23 according to an embodiment of the invention. Data 1, in the form of operating software for a motor vehicle in which the mobile unit 23 is arranged, are transmitted by a transmission device 21 to the mobile unit 23. For this purpose, the transmission device 21 includes several transmitting devices 8, which transfer a data stream 20 over multiple transmission paths 22. The transmission paths 22 comprise multiple distinct physical connection paths such as wireless connections in the form of a short-wave radio connection, a Bluetooth connection, a long-wave radio connection, a digital radio connection, a GSM mobile radio connection or a wired connection in the form of a direct cable connection. A transmitting device 8 corresponding to each of these transmission paths 22 is provided within in the transmission device 21.

In order to receive the data stream 20, the mobile unit 23 includes several receiving devices 9 that can receive the data stream 20 from the transmission paths 22. Each of the receiving devices 9 is designed for receiving the data stream 20 from a particular transmission path 22. Thus, for a data stream 20 there exist different transmission paths 22 via which the data 1 can be transferred from the transmission device 21 to the mobile unit 23. Within the mobile unit 23 the data 1 is stored in a target memory 13 thereby replacing, for instance, outdated operating software by an updated version.

Regarding the data transfer demonstrated in FIG. 1, a unidirectional connection between the transmission device 21 and the mobile unit 23 is used. This means that the transmission device 21 can, in general, not determine which data 1 are required or desired by the mobile unit 23. For this reason the transmission device 21 transmits a data stream 20 that comprises a variety of data 1 so that further data 1, in addition to the data 1 required or desired by the mobile unit 23, are included in the data stream 20. This additional data 1 can be either data 1 intended for transmission to other mobile units 23 or data 1 which are intended for the same mobile unit 23 for another purpose. Thus, the data stream 20 is composed in the transmission device 21 in such a way that it comprises an ensemble of updated data 1 for a multitude of mobile units 23.

Extracting the required or desired data 1 from the data stream 20 is accomplished at the end of the mobile unit 23. For this purpose, the data 1 in the data stream 20 are appropriately labelled with an identifier, allowing the required or desired data 1 to be filtered out of the data stream 20 by the mobile unit. The identifier can be designed in such a way that the labelled data 1 are only filtered from the data stream 20 by a specific, individual mobile unit 23. It is, however, also possible to design the identifier in such a way that the labelled data 1 can be filtered out of the data stream 20 by a group of several mobile units 23. Thus, based on the labelling of the data 1 within the transmission device 21 individual mobile units 23 or groups of mobile units 23 can be flexibly addressed. Prerequisite for this is that the data stream 20 can be received from at least one of the transmission paths 22 by the individual mobile units 23.

FIG. 2 demonstrates the data transfer in accordance with the embodiment of the invention at the transmission device 21 end. The transmission device 21 is fed with an ensemble of data 1 comprising, for example, operating software or operating data for different types of motor vehicles. By means of segmenting means 2, the ensemble of data 1 is segmented into transmission units in the form of packets. Labelling means 5 process a list of transmission units that form superordinate data blocks, e.g. a program or a sub-program of the operating software for a specific motor vehicle. The labelling means 5 have available to them information on which data 1 are suitable for which type of motor vehicle. In addition, further classification information is available that allows for specific data to be associated with individual motor vehicles or flexibly designed groups of motor vehicles. This association is effected within the transmission device 21 without utilizing any direct information channel between the motor vehicles, i.e. the mobile units 23, and the transmission devices 21.

The transmission units generated by the segmenting means 2 are encrypted by encrypting means 3. For this purpose, the segmenting means 2 are supplied with corresponding keys from a key library 4. The segmenting means 3 thus generate encrypted transmission units that are marked with an identifier 7 generated by the labelling means 5. In this context, it is possible that the encryption means 3 carry out the encryption independently of the identifier 7 or in combination with the identifier. In the latter case, a decryption of the transmission units is only possible in combination with an individual identifier for a specific motor vehicle or a specific type of motor vehicles.

The encrypted and labelled transmission units are transferred to memory means 6 where they are assembled into a data stream 20. The memory means comprise individual memory units that are each assigned to a transmitting device 8 for a specific transmission path 22. Each memory unit includes the ensemble of data 1 segmented into a multitude of labelled and encrypted transmission units. The memory units are designed in the form of a data carousel, i.e. they forward the stored transmission units in a cyclically repeating manner to the transmission path 22 via a transmitting device 8 assigned to them. Thus, a data stream 20 is generated which comprises the ensemble of data 1 in the form of labelled and encrypted transmission units and repeats itself in an infinite loop. The transmission of the data stream 20 is effected such in a way that the data stream 20 can be received by a multitude of mobile units 23 with corresponding receiving means 9.

FIG. 3 illustrates the data transfer according to the embodiment of the invention at the mobile unit 23 end. The mobile unit 23 comprises receiving devices 9, each of which receive the data stream 20 from an individual transmission path 22. The receiving devices 9 forward the transmission units received from the data stream to memory means 10. For each of the receiving devices the memory means 10 comprise a memory unit in which the transmission units received by the receiving device are collected. The reception of transmission units occurs dependent on transmission capacity, transmission quality and availability of the individual transmission paths 22. The transmission units are forwarded from the memory means 10 to a reception memory 11 where they are filtered on the basis of their identifiers 7. This means that transmission units assigned to the mobile unit 23 by means of their identifiers 7 are stored in the reception memory 11 while other transmission units are discarded. The identifier 7 can be either an identifier permanently assigned to the mobile unit, e.g. a type identifier for the motor vehicle in which the mobile unit 23 is installed, or a temporary identifier, which can be assigned for a limited period of time to the mobile unit 23, as required. Here, it is important that the labelling means 5 of the transmission device 21 have the appropriate additional information available to them.

The transmission units filtered from the data stream are decrypted by the decryption means 12 and stored in the target memory once the data from the transmission units have been completely reassembled.

Should updated data become available in the mobile unit 23 in this way, upgrades or updates can be executed for the associated devices of the motor vehicle. This can occur automatically, but is preferably executed after confirmation by an authorized person, e.g. the vehicle owner. In this respect, a suitable authorization verification can be provided.

As can be seen from the above description, a data stream comprising the entirety of updated data is generated during the data transfer. The data stream can be received by a multitude of mobile units. The selection of relevant data from the data stream is effected at the mobile unit end. During data transfer, different transmission paths can be used, whereby the individual characteristics as well as the availability of the individual transmission paths can be optimally exploited. In particular when a multitude of mobile units is involved, effective data transfer with maximum utilization of the available bandwidth is guaranteed.

The invention claimed is:

1. A method of transferring operating software of a motor vehicle to at least one mobile unit arranged in the motor vehicle, the method comprising:
   labeling of operating data with an identifier that assigns the operating data to the at least one mobile unit;
   providing a data stream which comprises a plurality of transmission units labeled with the identifier, wherein the data stream is receivable by a multitude of mobile units, and wherein a portion of the transmission units include portions of the labeled operating data of the motor vehicle;
   repeatedly transmitting the transmission units of the data stream by means of at least one transmission device via at least one transmission path;
   receiving the data stream by means of at least one receiving device of the at least one mobile unit in the motor vehicle;
   filtering of the transmission units from the data stream on the basis of their identifier from the received data stream in the at least one mobile unit in the motor vehicle; and
   re-assembling in the motor vehicle of the operating data from the filtered transmission units in the at least one mobile unit; wherein upon filtering of the transmission units from the data stream, the transmission units which are assigned to the at least one mobile unit on the basis of the identifier are stored to re-assemble the operating data into the operating software while other transmission units from the data stream are discarded;
   wherein the data stream with the transmission unit provided with the identifier is transmitted by a multitude of transmitting devices; and wherein the receiving device of the at least one mobile unit is configured to receive the transmission units transmitted by various transmitting devices.

2. The method according to claim 1, wherein the data to be transferred are encrypted and the received data are decrypted in the at least one mobile unit.

3. The method according to claim 1, wherein the data stream is transmitted via multiple transmission paths; and wherein the at least one mobile unit comprises multiple receiving devices which are configured to receive the data stream with the transmission units provided with the identifier via one of the transmission paths, respectively.

4. The method according to claim 1, wherein the at least one transmission path comprises a short range wireless connection.

5. The method according to claim 1, wherein the at least one transmission path comprises a long-range wireless connection.

6. The method according to claim 1, wherein the at least one transmission path comprises a wired connection.

7. The method according to claim 1, wherein the identifier assigns the data to multiple mobile units.

8. The method according to claim 1, wherein the data stream comprises data which are to be transferred to at least one further mobile unit and are assigned to the at least one further mobile unit with a further identifier.

9. A device for receiving operating software of a motor vehicle in a mobile unit arranged in the motor vehicle, the method comprising:
- a receiver in the motor vehicle for receiving a data stream comprising a plurality of transmission units which are labeled with an identifier which assigns the labeled transmission units to the mobile unit, wherein some of the transmission units include portions of the operating software of the motor vehicle, the transmission units being repeatedly sent out by a multitude of transmitting devices and being receivable by a multitude of mobile units;
- a filter for filtering the labeled transmission units from the received data stream on the basis of the identifier;
- memory of the receiver for storing the labeled transmission units which are assigned to the at least one mobile unit by the identifier; and
- a processor of the receiver for discarding other transmission units of the data stream that do not include the portions of the operating software and re-assembling the stored and labeled transmission units which are filtered from the data stream on the basis of the identifier to compile the operating software;
- wherein the receiver is configured to receive the transmission units from various transmitting devices.

10. The device according to claim 9, comprising: means for decrypting the received data in the mobile unit.

11. The device according to claim 9, comprising: multiple receiving devices which are configured to receive the data stream with the transmission units via one of the transmission paths, respectively.

12. The device according to claim 9, wherein the at least one transmission path comprises a short range wireless connection, a long range wireless connection, or a wired connection.

13. A system for transferring data to at least one mobile unit in a motor vehicle wherein the data transferred to the at least one mobile unit comprise operating software, comprising: a plurality of devices for transferring data to the at least one mobile unit, which comprises labeling means for labeling transmission units of a data stream with an identifier which assigns the transmission units to the at least one mobile unit, the transmission units being receivable by a multitude of mobile units, and including portions of labeled operating data, and transmitting means which repeatedly send out the transmission units via at least one data path to the at least one mobile unit; a device for receiving data in a mobile unit, which comprises a receiver for receiving the data stream and filter means for filtering the labeled transmission units from the data stream on the basis of the identifier; means for storing the labeled transmission units which are assigned to the at least one mobile unit by the identifier; means for discarding other transmission units received from the data stream; and means for re-assembling transmission units which are filtered from the data stream on the basis of the identifier to re-assemble the operating data into the operating software for the motor vehicle; and wherein the receiver is configured to receive the transmission units from various transmitting devices.

14. The system according to claim 13, comprising: encryption means for encrypting the data to be transferred.

15. The system according to claim 13, comprising: a multitude of transmitting devices for transmitting the data stream via multiple transmission paths.

16. The system according to claim 13, wherein the at least one data path comprises a short range wireless connection, a long range wireless connection or a wired connection.

17. A motor vehicle, comprising: at least one mobile unit with a receiver for receiving a data stream comprising transmission units which are labeled with an identifier which assigns the labeled transmission units to the mobile unit, the transmission units being repeatedly sent out and being receivable by a multitude of mobile units and filter means for filtering the labeled transmission units from the received data stream on the basis of an identifier wherein the transmission units include portions of the labeled operating data of the motor vehicle and are repeatedly transmitted by means of at least one transmission device via at least one transmission path; means for storing labeled transmission units which are assigned to the at least one mobile unit by the identifier; means for filtering the stored labeled transmission units from the data stream based on their identifier from the received data stream; means for discarding other transmission units of the data stream; and means for re-assembling the transmission units which are filtered from the data stream on the basis of the identifier wherein the operating data are re-assembled into operating software for the motor vehicle; and wherein the data transmitted to the at least one mobile unit comprise operating software of the motor vehicle; and wherein the receiver is configured to receive the transmission units from various transmitting devices and the data stream is transmitted by said various transmitting devices.

* * * * *